L. E. SCRANNAGE & G. P. GREGORY.
GAGE.
APPLICATION FILED AUG. 25, 1917.
1,278,512.
Patented Sept. 10, 1918.
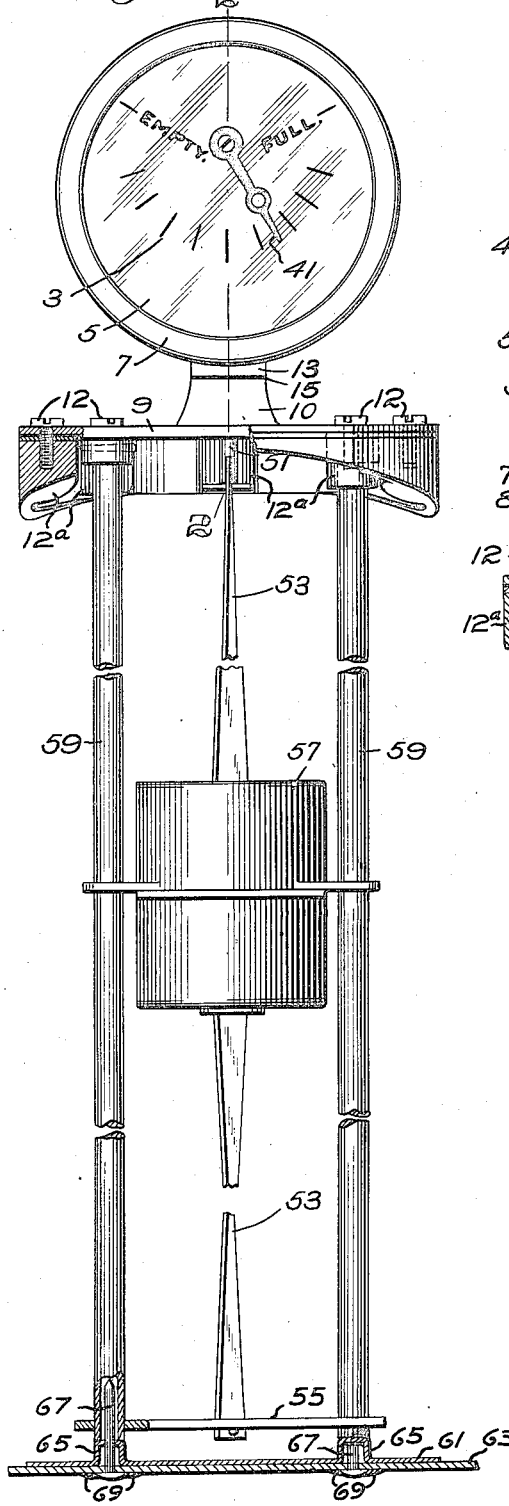
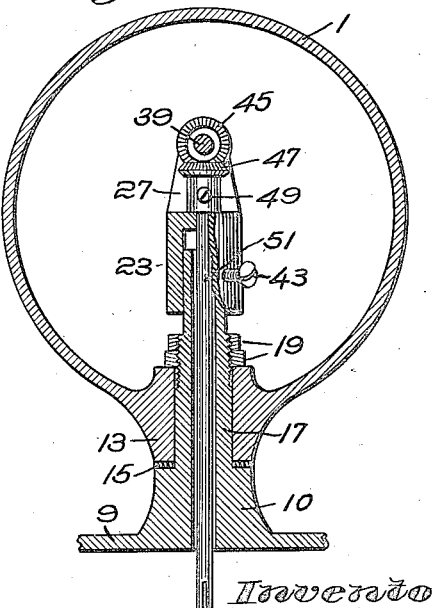
Inventors:
George P. Gregory &
Lawrence E. Scrannage
by Robt. P. Hains
Attorney

UNITED STATES PATENT OFFICE.

LAWRENCE E. SCRANNAGE, OF MEDFORD, AND GEORGE P. GREGORY, OF BOSTON, MASSACHUSETTS, ASSIGNORS TO THE BOSTON AUTO GAGE COMPANY, OF BOSTON, MASSACHUSETTS, A CORPORATION OF MASSACHUSETTS.

GAGE.

1,278,512.          Specification of Letters Patent.     Patented Sept. 10, 1918.

Application filed August 25, 1917. Serial No. 188,222.

*To all whom it may concern:*

Be it known that we, LAWRENCE E. SCRANNAGE and GEORGE P. GREGORY, citizens of the United States, residing at Medford, county of Middlesex, and Boston, county of Suffolk, and State of Massachusetts, respectively, have invented an Improvement in Gages, of which the following description, in connection with the accompanying drawings, is a specification, like characters on the drawings representing like parts.

The invention hereinafter described relates to gages for indicating the level of liquids, and is designed more particularly for gasolene tanks of engines for driving aeroplanes.

The gasolene gage for an aeroplane preferably should be located directly in front of the driver where its reading can be readily visualized, without distracting his attention unduly from the control of the aeroplane.

One object of the present invention is to provide a gage having its dial in a substantially vertical plane where it may conveniently face the driver, and simple and effective means for transmitting movement from a substantially vertical float operated shaft rising from the gasolene tank, to an index shaft extending transversely to the float operated shaft.

Gages for the use described may be so exposed that strong air pressure will be brought to bear thereon. Another object is to provide a strong and simple means for securing the gage to the gasolene tank.

Another object is to provide a gage having an air tight casing with a hollow supporting post therefor communicating with the tank and permitting the float operated shaft to project up from the tank into the casing without leakage of gasolene from the tank.

And another object is to provide a light, simple, effective gage, the parts of which may be easily manufactured and assembled, and a gage sufficiently strong reliably to register its readings under the hard usage which aeroplanes necessarily experience.

The character of the invention may be best understood by the following description of one good form thereof shown in the accompanying drawings, wherein:—

Figure 1 is a front elevation of the gage;

Fig. 2 is a vertical section taken on the line 2—2 of Fig. 1; and

Fig. 3 is a vertical section taken on the line 3—3 of Fig. 2.

Referring to the drawings, the gage shown therein as embodying the invention comprises a casing 1 having a front sight aperture containing a dial plate 3 seated on and secured to a counter-bore in said casing. This dial plate is provided with a series of graduations suitably marked to indicate the level of the liquid. A glass 5 is provided in front of the dial, and is secured between the front end of the casing and a bezel 7 having a flange threaded to said casing, a gasket 8 being interposed between the front of the casing and the glass. The casing may be of one integral piece, and have a stream line body tapered rearwardly to reduce the head resistance to the air.

As stated, it is important that the casing should be provided with strong means to secure the same to the gasolene tank. To accomplish this, a base or flange 9 may be provided having a boss or neck 10 projecting upward therefrom, said base being mounted on a collar 11 appropriately secured with a tight fit to the tank, a suitable gasket 11$^a$ being interposed between said base and collar. The base may be detachably secured to the collar by screws 12 entered through the base into tapped holes in bosses 12$^a$ depending from said collar, the lower ends of said holes being closed to prevent leakage of gasolene around said screws.

The casing has a neck 13 at the bottom thereof supported by said boss or neck 10, a suitable gasket 15 being interposed between them. A support, in the present instance of the invention in the form of a hollow post 17 which may be integral with the base boss 11, rises therefrom through a bore in said neck and projects upward a substantial distance into said casing. A portion of this post may be threaded to receive lock nuts 19. When these nuts are tightened they will press the neck toward the boss and strongly secure the casing to the base. Dowel pins 21 may be driven up through the base boss and project into holes in said neck to locate and hold the casing in proper position of rotative adjustment.

The upper end of the post may project into a socket 23 of a bracket 25 having an upright 27 provided with a bearing 29. An upright 31 provided with a bearing 33 may be detachably secured to the bracket by screws 35 tapped into the socket.

A cross shaft 37 may be journaled in the bearings 29 and 33 and have an enlargement 39 thereon for limiting axial movement of said shaft. The front end of the shaft projects through a hole in the dial plate and carries an index 41 coöperating with the dial plate to indicate the level of the liquid.

The bracket may be vertically and rotatively adjusted on the post to bring the index shaft in proper alinement with the hole in the dial plate and may be secured by a set screw 43 tapped into the bracket socket and engaging the post.

The index shaft has a bevel gear 45 fast thereon meshing with a bevel gear 47 having a wide hub detachably secured by a screw 49 to the upper end of an upright actuating shaft 51 projecting downward through a hole in said bracket and thence through the hollow post 17 and base 9. The lower end of this shaft projects somewhat beneath said base into the gasolene tank where it is connected to a twisted ribbon 53 having its lower end journaled in a plate 55. A float 57 is adapted to slide along said ribbon and is guided by rods 59 secured to the plate 55 and to bosses depending from the base 9.

It is important that the lower ends of the guide rods should be connected to the bottom of the tank to prevent the rods from being bent or torn from the base by the wash of the gasolene against the float. To accomplish this, a plate 61 (Fig. 1) may be secured to the inside of the bottom 63 of the tank and have sockets 65 pressed up therefrom adapted to engage the lower ends of the guide rods which preferably project somewhat beneath the plate 55. Pins 67 may be driven through the bottom of the tank and the tops of the sockets and project into the guide rods which preferably are made hollow. Thus the pins will have a two point support to hold the same upright. The heads of the pins may be soldered as at 69 to the outer surface of the bottom of the tank to prevent leakage around the same. The construction is such that when the gage is applied to the tank, it is merely necessary to slip the guide rods over the pins, in order to properly position and maintain said rods in proper relation with respect to the bottom of the tank.

To assemble the parts of the gage, the neck of the casing is slipped down onto the base post 17 and located in its proper position of rotative adjustment by the dowel pins 21. Then the lock nuts 19 are set up to firmly secure the casing on the neck of the base. Next, the socket of the bearing bracket is slipped down onto the top of the post over the upper end of the float shaft. The bevel gear 47 may then be secured to the upper end of said shaft above the bracket. The index shaft may now be inserted into its bearing 29 and the upright 31 may be slid over the end of the index shaft until limited by the enlargement 39 of said shaft. The upright is then secured to the bracket by tightening the screws 35. The bearing bracket is then adjusted to bring the bevel gears into meshing relation and to bring the index shaft in proper position to register with the hole in the dial plate. The bracket is secured by tightening the screw 43. Next the dial plate is fixed to the casing, the index is secured to its shaft, and the glass and bezel are secured to the casing.

It will be noted that the actuating shaft 51 projects loosely through the hollow supporting post and therefore the casing is in communication with the interior of the gasolene tank. However, there will be no possibility of escape of gasolene from the casing, since it is air tight and the connections between the casing and the supporting post on the base and between the base and the collar on the tank, are such that there can be no leakage between them.

In operation, the float will rise and fall according to the change in the level of the liquid in the tank, and in so doing, it will be guided by the rods 59 which prevent it from rotating. As the float slides along the twisted ribbon, it will rotate the latter and the shaft 51 connected thereto. The bevel gears will transmit the rotation of the latter shaft to the index shaft and cause the index to move over the dial and indicate the level of the liquid.

Since the casing 1 is connected by the neck 10, 13 with the base 9, and the guide rods 59 are connected to said base, they may be removed as a unit from the gasolene tank on release of the screws 12 from the collar, and thus all of said parts are rendered easily accessible for inspection, adjustment and repair thereof.

It will be understood that the invention is not limited to the specific embodiment shown, but that various deviations may be made therefrom without departing from the spirit and scope of the appended claims.

What is claimed is:—

1. A gage for indicating the level of liquids comprising a casing having a bore and a sight opening therein, a dial plate over said opening, a base member having a hollow post thereon projecting upward through said bore into said casing, means to secure said post to said casing, a bearing bracket mounted on said post, means to secure said bracket to said post, a float shaft projecting through said post and bracket, a bevel gear on the upper end of said shaft, a cross shaft above said gear and journaled in said bracket, a bevel gear on said cross shaft meshing with said first-named bevel gear, and an index actuated by said cross shaft and coöperating with said dial plate to indicate the level of the liquid.

2. A gage for indicating the level of liquids comprising a casing having a bore and a sight opening therein, a dial plate over said opening, an index coöperating with said dial plate, a bracket having a bearing integral therewith, a bearing detachably secured to said bracket, a shaft for actuating said index and journaled in said bearings, a bevel gear on said shaft, means on said shaft between said bearings to limit axial movement of said shaft, a base having a hollow post projecting up through said bore into said casing to support said bracket, a float shaft projecting through said post and bracket toward said index shaft, and a bevel gear on said float shaft meshing with the bevel gear on said index shaft.

3. A gage for indicating the level of liquids comprising a base having a boss with a hollow post projecting upward therefrom, a casing having a bore receiving said post, a nut threaded on said post in said casing to confine the latter between said boss and nut, a bracket detachably secured to the upper end of said post and having opposed bearings therein, a shaft journaled in said bearings, an index actuated by said shaft, a dial plate in said casing coöperating with said index, a bevel gear on said shaft, a float shaft projecting up through said base, hollow post and bracket toward said index shaft, and a bevel gear on said float shaft meshing with the bevel gear on said index shaft.

4. A gage for aeroplanes comprising a hood-like casing having a front face and a body tapering rearward from said face to reduce head resistance of the air thereon, a dial at said front face, an index coöperating with said dial, a neck projecting down from said body and having an outwardly projecting flange at the lower end thereof, a hollow post rising upward away from said flange into the body of said casing and having a pair of bearings at the upper end thereof, and means to actuate said index including a cross shaft journaled in said bearings, a bevel gear on said cross shaft, an upright shaft projecting through said post toward said cross shaft, a bevel gear on said upright shaft meshing with the gear on said cross shaft, a float, and means to impart rotary movement to said upright shaft from said float.

5. A gage for aeroplanes comprising a casing having a front face, and a body tapering rearwardly from said face to reduce head resistance of the air thereon, a hollow neck projecting downward from said body, a dial at said front face, a glass covering said dial, an index mounted between said dial and glass, a collar for connection with a fuel tank, a hollow post projecting upward through said neck into said casing; and means to actuate said index including an upright shaft projecting through said post, a bevel gear on the upper end of said shaft, a cross shaft above said bevel gear, a bevel gear on said cross shaft driven by said bevel gear, a float, and means coöperating with said float for rotating said upright shaft.

6. A gage for aeroplanes comprising a casing having a front face, and a body tapering rearwardly from said face to reduce head resistance of the air thereon, a base, a neck extending downward from said body to said base, a collar for connection with a fuel tank, means to connect said base detachably with said collar, a tubular post projecting up into the body of said casing, a dial at said front face, a glass secured to said body for covering said dial, an index mounted between said glass and dial, and means to actuate said index including a shaft projecting up through said tubular post, and a pair of intermeshing gears rotated by said shaft and located in the body of said casing.

7. A gage for aeroplanes comprising a casing formed of an integral casting having a front face and a stream line body tapering rearwardly from said face, a neck projecting downward from said body intermediate said face and the rear end of said body; a base for connection with said neck and a fuel tank, a tubular post rising from said base into said casing, a dial at said front face, an index coöperating with said dial, a float, guide means for said float connected to said base, and means to impart movement from said float to said index including a shaft projecting through said base and tubular post into said casing, and intermeshing gears mounted on said post in said casing and actuated by said shaft.

8. A gage for aeroplanes comprising a casing having a front face, and a body tapering rearwardly from said face to reduce head resistance of the air thereon, a dial plate at said front face, a glass covering said dial, an index mounted between said dial and glass, a collar for connection with a fuel tank, a base mounted on said collar, means detachably to secure said base to said collar, a hollow neck connecting said base with the body of said casing, a hollow post projecting upward toward the top of said casing and having a pair of bearings thereon, guide rods secured to and depending from said base, a float slidable along said guide rods, and means to impart movement from said float to said index including an upright shaft projecting through said neck and post, a cross shaft journaled in the bearings carried by said post, and intermeshing bevel gears fast on said cross and upright shafts for rotating the former from the latter.

9. A gage for indicating the level of liquids comprising an air tight casing having a hole in the bottom thereof, a dial plate mounted in said casing, an index movable over said plate, a base for said casing, a hollow supporting post rising from said base into said casing, means to prevent leakage between said post and casing, a collar for a tank beneath said base and having tapped bosses with closed ends depending therefrom, a packing member between said collar and base, screws projecting through said base into said tapped bosses to secure said base to said collar, an actuating shaft projecting through said collar, base and post into said casing, and means mounted on said post to transmit movement from said actuating shaft to said index.

10. An instrument for indicating the level of liquids comprising in combination, a casing having a hole in the bottom thereof, a base for said casing, a hollow supporting post rising from said base through said hole into said casing, a dial plate mounted in said casing, an index coöperating with said plate, an actuating shaft projecting through said post, means on said post to transmit movement from said shaft to said index, guide rods connected to said base, a float movable along said rods, a twisted ribbon connected to said actuating shaft and receiving rotative movement from said float, means at the lower ends of said guide rods for positioning the same with relation to the bottom of a tank, and means to position said base on the top of the tank.

In testimony whereof, we have signed our names to this specification.

LAWRENCE E. SCRANNAGE.
GEORGE P. GREGORY.